(12) United States Patent
Marritt

(10) Patent No.: US 6,231,655 B1
(45) Date of Patent: May 15, 2001

(54) AQUEOUS INK COMPOSITION FOR USE IN AN INK JET PRINTER

(75) Inventor: William Alan Marritt, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/521,570

(22) Filed: Mar. 9, 2000

(51) Int. Cl.$^7$ .................................................. C09D 11/00
(52) U.S. Cl. .................................. 106/31.58; 106/31.86; 106/31.43; 106/31.75; 106/31.6
(58) Field of Search .............................. 106/31.58, 31.86, 106/31.43, 31.75, 31.6

(56) References Cited

U.S. PATENT DOCUMENTS

| | | | |
|---|---|---|---|
| 3,741,986 | 6/1973 | Hartmann | 260/340.9 |
| 5,690,722 | 11/1997 | Pawlowski | 106/31.58 |
| 5,766,325 * | 6/1998 | Gundlach et al. | 106/31.43 |
| 5,766,326 * | 6/1998 | Gundlach et al. | 106/31.47 |
| 5,772,744 * | 6/1998 | Gundlach et al. | 106/31.43 |
| 5,776,230 * | 7/1998 | Gundlach et al. | 106/31.43 |
| 5,810,916 * | 9/1998 | Gundlach et al. | 106/31.49 |
| 5,888,285 * | 3/1999 | Gundlach et al. | 106/31.43 |
| 5,919,293 * | 7/1999 | Moffatt et al. | 106/31.57 |

FOREIGN PATENT DOCUMENTS

| | | |
|---|---|---|
| 0322110 | 6/1989 | (EP) . |
| 6284171 | 4/1987 | (JP) . |
| 62177075 | 8/1987 | (JP) . |
| 6413080 | 1/1989 | (JP) . |

OTHER PUBLICATIONS

Patent Abstract of Japan of JP 62177075 Dated Aug. 3, 1987.

* cited by examiner

Primary Examiner—Helene Klemanski
Assistant Examiner—Veronica F. Faison
(74) Attorney, Agent, or Firm—Ladas & Parry

(57) ABSTRACT

An ink composition including water as the principal solvent, a pigment dispersion or dye, and a polyoxyalkylenated polyfluoro-isopropylidene glycerol compound. The composition may be formed by using a pigment dispersion having a pigment and a pigment dispersant. The pigment dispersant may be a derivative of a polyuronic acid in which a hydrophobic polymer is covalently attached to the reducing terminus of the polyuronic acid. The polyuronic acid may be composed primarily of 1,4-linked polygalacturonic acid, polyguluronic acid, polyiduronic acid, or mixed polymers thereof.

21 Claims, No Drawings

AQUEOUS INK COMPOSITION FOR USE IN AN INK JET PRINTER

FIELD OF THE INVENTION

This invention relates to an aqueous ink composition for use in inkjet printing, and, more particularly, to an aqueous ink composition containing polyoxyalkylenated polyfluoroisopropylidene glycerol compounds as cosolvents.

BACKGROUND OF THE INVENTION

Ink jet printing is a non-impact printing process in which the printer produces droplets of ink in response to digital signals, such as those generated by a computer. The droplets of ink are deposited on a substrate medium such as paper or transparent films. Ink jet printers have found broad commercial acceptance due to their print quality, low cost, relatively quiet operation, and graphics capability. Thermal (bubble jet) and piezoelectric drop-on-demand printers have been especially successfiul in the marketplace and have found broad application as printers for personal computers in the office and the home.

Three major concerns dominate inkjet technology: (1) reliability, (2) drying rate, and (3) print quality. The first two concerns, reliability and drying rate, are strongly influenced by cosolvents which are included in the aqueous ink compositions. Ifthe drying rate is ignored, print quality is also influenced by cosolvents. However, for ink jet inks with relatively fast drying rates, print quality is only slightly influenced by the addition of cosolvents. As the present invention relates to aqueous ink compositions, which have relatively fast drying rates and which contain novel compounds as cosolvents, the advantages of the novel compounds with respect to reliability and drying rate are emphasized. Typically, reliability is evaluated with respect to the following four criteria. The first is robustness with respect to continuous printing conditions such that the ink droplet weight does not change over time and good directionality is maintained. Good directionality means that the angular deviation of an ejected ink droplet from a nozzle is within about ±0.5° from the normal to the plane of the nozzle. The second is robustness with respect to intermittent printing conditions such that the nozzles do not clog over the time interval in which printing is discontinued. The third is robustness with respect to long term storage of the ink within the print head such that printing behavior unchanged from the original printing behavior (ink droplet weight and good directionality) can be restored after applying a limited amount of suction to the nozzles. The fourth is chemical and physical stability of the ink towards storage at two temperature extremes and towards cycling between those two temperature extremes for an extended period of time. The drying rate of the ink is an important factor in determining the throughput rate of the printer. In a sheet fed printer, the ink on a printed sheet must be dry before the succeeding sheet contacts it. If the ink is not dry, smearing will occur.

Robustness with respect to continuous printing, robustness with respect to intermittent printing, and robustness with respect to long term storage of the ink within the print head are generally highly correlated. Failure to achieve the necessary robustness is often due to evaporation of solvent (s) causing precipitation and/or crystallization of solids at the air/liquid interfaces, which exist in every nozzle on the print head. For inks which contain dispersed pigments as the colorant, failure to achieve the necessary robustness may also be caused by flocculation of the dispersed pigments due to a change in solvent composition as solvent or cosolvents evaporate. Typical cosolvents which contribute to achieving the necessary robustness with respect to continuous printing, intermittent printing, and long term storage of the ink within the print head are typically classified as humectants. Humectants have high affinities for water and relatively high boiling points. A necessary property, but not a sufficient property, for a humectant cosolvent is a boiling point greater than about 230° C.

Chemical and physical stability of the ink towards storage at two temperature extremes and towards cycling between those two temperature extremes is relatively easy to achieve for inks in which water-soluble dyes are used as the colorant. For inks which contain dispersed pigments, many commonly used cosolvents will cause destabilization of typical pigment dispersions, especially at the high temperature extreme.

Formulating ink compositions which dry sufficiently rapidly on a variety of media is well known in the art. Rapid drying is achieved by having the ink composition penetrate into the interior of the print medium. To facilitate penetration, media penetrating cosolvents, which are known in the art as penetrants, are included in the ink composition. Typical penetrant cosolvents have separate hydrophobic and hydrophilic parts.

The two concerns, reliability and drying rate, are often in conflict. As a result, it is difficult to obtain both reliability and a sufficient drying rate with a single additive. In general, cosolvents which are advantageous with respect to obtaining good reliability are poor penetrants. In contrast, cosolvents which are good penetrants are, in general, not advantageous with respect to obtaining good reliability. Accordingly, a need exists for cosolvents which are good penetrants and which are not deleterious to ink reliability.

In Japan Laid-Open Patent Application 62-84171, an aqueous recording solution, which contains either a cyclic acetal, derived from glycerol and an aldehyde, or a cyclic ketal, derived from glycerol and a ketone, is described. The aldehydes and ketones of that invention are hydrocarbon based and contain only carbon, hydrogen, and oxygen. Enumerated aldehydes include the following hydrocarbon aldehydes: formaldehyde, acetaldehyde, propionaldehyde, butyraldehyde, isobutyraldehyde, benzaldehyde, etc. Enumerated ketones include the following hydrocarbon ketones: acetone, 2-butanone, 3-pentanone, cyclohexanone, 4-methyl-2-pentanone, d-camphor, acetophenone, diacetone alcohol, etc. In comparison to a dye-based ink containing 5% ethylene glycol and 10% glycerol, the example inks of Japan Laid-Open Patent Application 62-84171 containing cyclic acetals or cyclic ketals are faster drying. However, in comparison to current best practice inks which contain known penetrants, such as Butyl Carbitol (R) (diethylene glycol mono-n-butyl ether), both the example inks and that comparison ink would be considered slow drying inks.

In comparison to a dye-based ink containing 15% polyethylene glycol #300, the example inks of Japan Laid-Open Patent Application 62-84171 have better chemical and physical stability towards storage at 60° C. However, in comparison to current best practice inks, both the example inks and that comparison ink would lack the necessary robustness, with respect to continuous printing, intermittent printing, and long term storage of the ink within the print head, needed for actual use in a commercial printer. In summary, in comparison to cosolvents used in current best practice inks, the compounds claimed in Japan Laid-Open Patent Application 62-84171 are neither particularly good humectants nor particularly good penetrants.

In U.S. Pat. No. 3,741,986, a process is described for preparing cyclic ketals based upon (1) polyhydric alcohols containing at least three hydroxyl groups and at least three carbon atoms and (2) ketones wherein each alkyl radical is polyhalogenated. The cyclic ketals of that invention have proposed applications as fire-retardant additives in polyurethane and polyester resins and as anti-foaming additives.

None of the cyclic ketals derived from glycerol (Examples 1, 2, 3, 6, 9, 10, 11) are expected to be good humectants for use in inks, as they all have boiling points below 200 Cyclic ketals of this type, which are derived from polyhydric alcohols with higher molecular weights than glycerol, are expected to be better humectants than those derived from glycerol. However, in comparison to cosolvents used in current best practice inks, the compounds claimed in U.S. Pat. No. 3,741,986, are neither particularly good humectants nor particularly good penetrants.

In Japan Laid-Open Patent Application 64-13080, novel polyoxyalkylenated cyclic acetals derived from polyhydric alcohols and one or more aldehydes and novel polyoxyalkenylated cyclic ketals derived from polyhydric alcohols and one or more ketones are described. The aldehydes and ketones of that invention are hydrocarbon based and contain only carbon, hydrogen, and oxygen. Enumerated aldehydes include the following: formaldehyde, acetaldehyde, propionaldehyde, butyraldehyde, hexanal, benzaldehyde, etc. Enumerated ketones include the following: acetone, 2-butanone, 2-pentanone, 2-hexanone, 3-pentanone, 3-hexanone, 3-heptanone, 4-heptanone, 4-octanone, 5-nonanone, acetophenone, cyclohexanone, cyclooctanone, etc. The degree of oxyalkylenation ranges from 1 to 100 for non-acetalized or non-ketalized hydroxyl functionalities. The polyoxyalkylenated cyclic acetals and polyoxyalkylenated cyclic ketals of that invention have proposed applications as ink additives, although no specific examples of this usage are given.

For the case in which the polyoxyalkylene chain is short, the compounds of that invention have proposed applications as solvents in aqueous inks. For the case in which the polyoxyalkylene chain is long, the compounds of that invention have proposed applications as emulsifying agents. Several compounds of that invention, in which the polyoxyalkylene chains are short, are expected to be good humectants for use in ink, comparable to current best practice humectants. However, in comparison to cosolvents used in current best practice inks, the compounds claimed in Japan Laid-Open Patent Application 64-13080, are not particularly good penetrants.

In European Patent Application EP 0322110 A2, compounds similar to those described in Japan Laid-Open Patent Application 64-13080 are described. The main difference between the two sets of compounds is that those in EP 0322110 A2 have a terminal primary amine on the non-acetal/ketal end of the polyoxyalkylene chain. The compounds of that invention are useful as intermediates in the preparation of polyoxyalkylene-substituted colorants which may be reacted with condensation polymers. Specifically, the compounds are useful for preparing colored modifiers for polyurethane foams. Several compounds of that invention, in which the polyoxyalkenyl chains are short, are expected to be good humectants for use in ink. However, the primary amine functionality may be problematic, in that without neutralization, inks containing compounds of this type may have compatibility problems with adhesives used in commercial print heads. In any case, in comparison to cosolvents used in current best practice inks, the compounds claimed in European Patent Application EP 0322110 A2, are not particularly good penetrants.

As can be seen from the above examples, cyclic acetals, cyclic ketals, and their polyoxyalkylenated derivatives have been prepared for use as cosolvents in inks and in other applications. As can also be seen from the above, however, none is particularly good as an ink jet ink cosolvent, especially in regard to obtaining good reliability and a rapid drying rate. Accordingly, there remains a need for cosolvents for use in ink jet inks which provide reliable printing performance and are rapid drying. In other words, a need exists for cosolvents which function both as good humectants and good penetrants.

SUMMARY OF THE INVENTION

It is an object of the present invention to provide an aqueous ink composition for use in ink jet printing which gives reliable printing performance and which is rapid drying.

In accordance with this and other objects of the invention, there is provided an aqueous ink composition comprising: (a) water as the principal solvent; (b) a pigment dispersion or dye; and (c) a polyoxyalkylenated polyfluoro-isopropylidene glycerol compound represented by the following Formula 1:

FORMULA 1

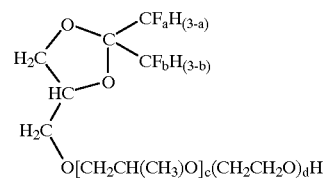

wherein
a = 1–3;
b = 1–3
a + b = 2–6
c = 0 or 1; and
d = (c + 1) - 4.

In a preferred embodiment of the invention, the pigment dispersion preferably comprises a pigment and a pigment dispersant. The pigment dispersant may be a derivative of a polyuronic acid in which a hydrophobic polymer is covalently attached to a reducing terminus of the polyuronic acid. The polyuronic acid preferably consists essentially of 1,4-linked polygalacturonic acid, polyguluronic acid, polyiduronic acid, or mixed polymers thereof.

In one embodiment of the invention, the hydrophobic polymer is preferably a homopolymer or copolymer prepared from at least one monomer selected from the group consisting of styrene or substituted styrenes, vinyl pyridine or substituted vinyl pyridines, methacrylic acid esters, acrylic acid esters, acrylonitrile, methacrylonitrile, butadiene, and isoprene. The hydrophobic polymer may be composed primarily of a poly(dimethylsiloxane). The hydrophobic polymer may beapolyamnide. The polyamide may be anN-acylated derivative of a polyamine, with the polyamine being one in which greater than 50% of the amine functionalities are either primary or secondary amines. The polyamine may be selected from the group of polyamines consisting of linear polyethylenimines, branched polyethylemimines, polyallylamine, poly(N-alkyl) allylamines, and polyvinylamine. The acyl groups, R—(CO)—, of the polyamide may comprise at least one acyl group selected from the group consisting of $C_nH_{(2+1)}$—(CO)—, in which n is greater than or equal to 3; phenyl-(CO)—; substituted phenyl-(CO)—; phenyl-$CH_2$—(CO)—; substituted phenyl-$CH_2$—(CO)—; phenyl-$C_2H_4$—(CO)—; and substituted phenyl-$C_2H_4$—(CO)—.

The hydrophobic polymer may be hydrophobic polyamine. The hydrophobic polyamine is a poly-N-alkylated derivative of a water soluble polyamine. The water soluble polyamine may be selected from the group of water soluble polyamines consisting of polyethylenimines, polyallylamines, polyvinylamines, poly(propylene imine) dendrimers, and poly(amidoamine) dendrimers.

In a preferred embodiment, the ink composition comprises 0.1 to 10 wt % of the pigment, 0.1 to 20 wt % of the pigment dispersant, and 70 to 99.8 wt % of an aqueous carrier medium. The ink composition preferably comprises 0.1 to 25% by weight of the compound of Formula 1 and 0.2 to 30% by weight of the pigment dispersion. The number average molecular weight of the polyuronic acid segment is preferably greater than or equal to 700. The number average molecular weight of the hydrophobic polymer segment is preferably greater than or equal to 300.

In accordance with the invention, the polyuronic acid segment of the pigment dispersant may be neutralized with a neutralizing agent selected from the group consisting of organic bases, alkanolamines, alkali metal hydroxides, and mixtures thereof.

DETAILED DESCRIPTION

The ink composition of the present invention is suitable for use in an ink jet printer using any of the methods known in the art for ejecting ink through a plurality of nozzles contained on a print head. The ink composition for the present invention can also be used in a writing instrument, such as a pen, in which the conditions for use of the ink are less stringent than those of an ink jet printer.

The aqueous ink composition of the present invention encompasses both pigment based inks and dye based inks. The pigment based inks comprise an aqueous carrier medium, a polyoxyalkylenated polyfluoro-isopropylidene glycerol cosolvent, and a pigment dispersion, which is an aqueous dispersion of pigment particles stabilized by dispersants. The dye-based inks comprise an aqueous carrier medium, a polyoxyalkylenated polyfluoro-isopropylidene glycerol cosolvent, and a dye. Dye-based inks are satisfactory for most applications, but generally have poor light fastness and water resistance. Pigment based inks can be prepared which have excellent light fastness and water resistance. For purposes of obtaining a printed document with a reasonable degree of permanency, pigment based inks are preferred over dye based inks. The inks of the present invention may be adapted to the requirements of a particular ink jet printer, especially with regard to viscosity, surface tension, and compatibility with the materials from which the print head is constructed.

POLYOXYALKYLENATED POLYFLUORO-ISOPROPYLIDENE GLYCEROL COSOLVENTS

The polyoxyalkylenated polyfluoro-isopropylidene glycerol cosolvents of the present invention are represented by the formula shown below. Polyfluoro is defined herein as greater than or equal to two fluoro groups.

FORMULA 1

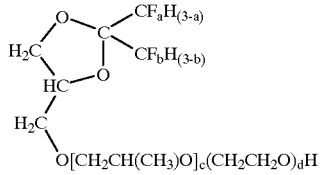

wherein
a = 1–3;
b = 1–3
a + b = 2–6
c = 0 or 1; and
d = (c + 1) · 4.

The compounds of the present invention may be prepared by any method known in the art. A straightforward approach for preparing these compounds is to first prepare a cyclic ketal from glycerol and a polyfluorinated acetone derivative, with ketalization occurring at the 1- and 2-position hydroxyl groups of glycerol. Polyfluorinated acetone derivatives which will result in cyclic ketals within the scope of the claims of the present invention include the following: 1,1-difluoroacetone, 1,3-difluoroacetone, 1,1,1-trifluoroacetone, 1,1,3-trifluoroacetone, 1,1,1,3-tetrafluoroacetone, 1,1,3,3-tetrafluoroacetone, pentafluoroacetone, and hexafluoroacetone. In the second step, the remaining free hydroxyl group at the 3-position of the glycerol fragment is oxyalkylenated, under basic conditions, using 1) ethylene oxide only or 2) one equivalent of propylene oxide followed by ethylene oxide.

Preparing cyclic ketals from glycerol and polyfluorinated acetone derivatives is more difficult than preparing the corresponding cyclic ketals from glycerol and non-fluorinated hydrocarbon based ketones. The latter reaction is typically carried out using an excess of the ketone, acid catalysis, and temperatures in the range of 40° C. to 180° C. In contrast, special methods must be used to drive the reaction of glycerol and a polyfluorinated acetone derivative beyond the formation of a stable hemiketal. According to the process described in U.S. Pat. No. 3,795,682 (the contents of which are incorporated herein by reference), the desired cyclic ketal compounds can be prepared by using a carbodiimide compound to dehydrate the stable hemiketal. Another process is described in U.S. Pat. No. 3,741,986 (the contents of which are incorporated herein by reference), in which glycerol carbonate is used instead of glycerol and the elimination of carbon dioxide is used to drive the ketalization reaction. A third process is described in U.S. Pat. No. 3,285,936, U.S. Pat. No. 3,324,144, U.S. Pat. No. 3,324,145, and in J. Am. Chem. Soc, Vol.: 112, Page: 9672, Year: 1990 (the contents of each of these publications being incorporated herein by reference), in which the epoxide, glycidol, is used instead of glycerol and a catalyst is used to catalyze the ring-opening of the epoxide by the ketone. This third process is the most practical for the production of the desired cyclic ketals on an industrial scale. The cyclic ketals may be purified by vacuum distillation prior to the oxyalkylenation reaction.

As noted above, in the second step, the remaining free hydroxyl group at the 3-position of the glycerol fragment is oxyalkylenated, under basic conditions. This reaction is typically conducted at temperatures in the range of 80° C. to 150 ° C. and at modestly elevated pressures. On a laboratory scale, the oxyalkylenation reaction(s) may be carried out under autogeneous pressure in a stainless steel autoclave. Typical basic catalysts for this reaction include tertiary amines, sodium hydroxide, potassium hydroxide, alkali metal hydrides, and alkali metal alkoxides. For polyoxyalkylenated polyfluoro-isopropylidene glycerol cosolvents of the present invention in which c=0 (i.e. the polyoxyalkylene fragment is derived solely from ethylene oxide), first, the reaction vessel is charged with the targeted stoichiometric amounts of ethylene oxide and the cyclic ketal. Next, the reaction is run until the ethylene oxide is completely consumed. Similarly, for cosolvents in which c=1 (i.e. the first oxyalkylene of the polyoxyalkylene fragment is derived from propylene oxide), first, the reaction vessel is charged with one equivalent each of propylene oxide and the cyclic ketal. Next, this reaction is run until the propylene oxide is completely consumed. Then, the reaction vessel is charged with the targeted stoichiometric amount of ethylene oxide and the reaction is run until it is completely consumed. The final products may be isolated and purified by vacuum distillation.

Without intending to be bound by theory, it is believed that the cosolvents of the present invention contribute to the printing reliability of inks containing these cosolvents by functioning as good humectants. All of the cosolvents of the present invention have boiling points greater than 230° C. and have high affinities for water, due to the four or more oxygen atoms available for hydrogen bonding with water. Furthermore, the cosolvents of the present invention are highly compatible with common humectants, such as glycerol and diethylene glycol, due to their structural similarities. Again, without intending to be bound by theory, it is believed that the cosolvents of the present invention contribute to the rapid drying of inks containing these cosolvents by functioning as good penetrants. As for typical penetrants, all of the cosolvents of the present invention have separate hydrophobic and hydrophilic parts. The hydrophilic part is the polyoxyalkylene fragment and the hydrophobic part is the polyfluoro-isopropylidene fragment of the cyclic ketal. Both the polyfluorination and the enforced stereochemistry of the polyfluoro-isopropylidene fragment are believed to be important factors in obtaining the desired penetrability of media by inks containing these cosolvents.

The amount of polyoxyalkylenated polyfluoro-isopropylidene glycerol cosolvent in the ink composition of the present invention is about 0.1% to 25% by weight, and more preferably 3% to 15% by weight.

PIGMENT DISPERSANTS

A pigment dispersion typically comprises a pigment and a pigment dispersant. Pigment dispersions, which do not contain dispersants, but instead are surface functionalized pigments, are also within the scope of the present invention, and some examples of this type are listed in the "Pigments" section. The pigment dispersants in a typical pigment dispersion may be polymeric dispersants or surfactant compounds. The surfactant compounds may be anionic, cationic, amphoteric, or nonionic. The amount of pigment dispersant in the ink composition of the present invention is about 0.1% to 30% by weight and more preferably 0.1 to 20% by weight.

POLYMERIC DISPERSANTS

Polymeric dispersants which are suitable for practicing the present invention include polyuronic acid derivatives, in which a hydrophobic polymer is covalently attached to the reducing terminus of the polyuronic acid. The polyuronic acid derivative is a two-part type dispersant containing a hydrophilic segment and a hydrophobic segment. The polyuronic acid is the hydrophilic segment and the hydrophobic polymer, which is covalently attached to the reducing terminus of the polyuronic acid, is the hydrophobic segment. The hydrophobic segment of the derivative adheres to the surface of the pigment, and, thus, links the dispersant to the pigment. The hydrophilic polyuronic acid segment extends into the aqueous medium and serves to disperse the pigment in the medium.

In addition to this dispersing function, the hydrophilic polyuronic acid segment has a structure which is optimized for binding to multivalent cations. Specifically, the polyuronic acid has a buckled chain structure consisting of up-down-alternating pockets lined with carboxyl groups and hydroxyl groups. Structural studies of polyuronic acids indicate that the pockets are just the right size for binding to dispositive calcium ions. When a pigment dispersion, in which the dispersant is a polyuronic acid derivative of the type described herein, comes in contact with the surface of plain paper, the polyuronic acid segment binds to multivalent cations, which are present on the plain paper surface. This binding results in destabilization of the pigment dispersion which prevents the pigment colorant from spreading out on the plain paper surface. The overall result is a printed image which has excellent print quality.

Random copolymers may be used as polymeric dispersants, although they are not as effective as the polyuronic acid derivatives described above in stabilizing pigment dispersions. Examples of random copolymers include half-esters of maleic acid/styrene copolymers, lignin sulfonate derivatives, acrylic acid/styrene copolymers, and methacrylic acid/styrene copolymers. Block copolymers of the type described in U.S. Pat. No. 5,085,698 (the contents of which are incorporated herein by reference) may also be used as polymeric dispersants.

Polyuronic Acid Segment

The polyuronic acid is composed primarily of 1,4-linked polygalacturonic acid, polyguluronic acid, polyiduronic acid, or mixed polymers thereof. The polyuronic acids are available from natural materials and may also contain non-uronic acid saccharides. The uronic acid content of the polyuronic acids used in this invention is greater than 80 wt. %. More preferably the uronic acid content is greater than 85 wt. %. Even more preferably the uronic acid content is greater than 90 wt. %.

Polygalacturonic acid is obtained by hydrolysis and de-esterification of pectin, a naturally occurring hydrocolloid which is obtained from fruits such as lemons, limes, grapefruits, oranges, mangoes, apples, sunflowers, and sugar beets. Polyguluronic acid is obtained by partial acid hydrolysis of alginic acid, a naturally occurring polysaccharide obtained from seaweeds such as giant kelp (*Macrocystis pyrifera*), horsetail kelp (*Laminaria digitata*), and sugar kelp (*Laminaria saccharina*), followed by selective precipitation. Polyiduronic acid is obtained by hydrolysis of various animal polysaccharides.

The number average molecular weight of the polyuronic acid used in the present invention is greater than or equal to about 700 and less than or equal to 10,000. More preferably the number average molecular weight of the polyuronic acid is greater than or equal to about 700 and less than or equal to about 7000.

Hydrophobic Polymer Segment

In one embodiment, the hydrophobic polymer segment is a homopolymer or copolymer prepared from at least one monomer selected from the group consisting of styrene or substituted styrenes, vinyl pyridine or substituted vinyl pyridines, methacrylic acid esters, acrylic acid esters, acrylonitrile, methacrylonitrile, butadiene, and isoprene. Representative monomers that may be selected include, but are not limited to, the following: styrene, α-methyl styrene, 3-methyl styrene, 4-methyl styrene, 4-tert-butyl styrene, 3-nitrostyrene, 3-fluorostyrene, 4-fluorostyrene, 2-vinyl pyridine, 4-vinyl pyridine, methyl methacrylate, ethyl methacrylate, propyl methacrylate, n-butyl methacrylate, tert-butyl methacrylate, hexyl methacrylate, 2-ethyl-hexyl methacrylate, octyl methacrylate, lauryl methacrylate, stearyl methacrylate, phenyl methacrylate, 2-ethoxyethyl methacrylate, 2-trimethylsiloxyethyl methacrylate, glycidyl methacrylate, p-tolyl methacrylate, methyl acrylate, ethyl acrylate, propyl acrylate, n-butyl acrylate, tert-butyl acrylate, hexyl acrylate, 2-ethyl-hexyl acrylate, octyl acrylate, lauryl acrylate, stearyl acrylate, phenyl acrylate, 2-ethoxyethyl acrylate, 2-trimethylsiloxyethyl acrylate, glycidyl acrylate, p-tolyl acrylate, acrylonitrile, methacrylonitrile, butadiene, and isoprene.

The hydrophobic polymer, incorporating at least one of the monomers listed above, may be prepared using conventional anionic polymerization techniques. Because anionic polymerization uses "living" polymeric carbanions, stringent conditions, with respect to the exclusion of oxygen, moisture, and other impurities, must be maintained during the polymerization reaction. Accordingly, solvents and monomers must be rigorously purified before polymerization.

Hydrophobic polymers prepared using conventional anionic polymerization techniques have very narrow molecular weight distributions. The typical polymer has a dispersity less than 1.5 and generally in the range of 1.0 to 1.3. Dispersity is the polymer weight average molecular weight divided by the number average molecular weight. Both the polymer weight average molecular weight and the number average molecular weight can be obtained from size exclusion chromatography, using columns calibrated with polymer standards of known molecular weights.

As is well known in the art for anionic polymerization, a number of electrophiles will react with "living" polymeric carbanions resulting in functional group terminated polymers. For the purpose of covalently attaching the hydrophobic polymer segment to the reducing terminus of the polyuronic acid, such functional group termninated polymers are desirable. Carboxyl terminated, hydroxyl terminated and amino terminated polymers can be readily prepared by conventional techniques.

In a second embodiment, the hydrophobic polymer segment is a hydrophobic polymer composed primarily of a poly(bis-alkyl-siloxane), preferably poly(dimethylsiloxane).

In a third embodiment, the hydrophobic polymer segment is a polyamide. Specifically, the polyamide hydrophobic polymer segment is an N-acylated derivative of a polyamine, with the polyamine being one in which greater than 50% of the amine functionalities are either primary or secondary amines.

The polyamine, from which the polyamide is derived, is selected from the group of polyamines consisting of linear polyethylenimines, branched polyethylenimines, polyallyamine, poly-N-alkylallylamines, and polyvinylamine. The acyl groups, R—(CO)—, of the polyamide comprise at least one selected from the following acyl groups: $C_nH_{(2n+1)}$—(CO)—, in which n is greater than or equal to 3; phenyl-(CO)—; substituted phenyl-(CO)—; phenyl-CH$_2$—(CO)—; substituted phenyl-CH$_2$—(CO)—; phenyl-C$_2$H$_4$—(CO)—; and substituted phenyl-C$_2$H$_4$—(CO)—.

The polyamide hydrophobic polymer segment may be prepared by first covalently attaching the polyamine, through one of its amine functionalities, to the reducing terminus of the polyuronic acid. This covalent attachment is readily accomplished by reductive amination, as described in detail in the following section ("Covalent Attachment to the Reducing Terminus of the Polyuronic Acid"). In the second step, the multiple amine functionalities of the covalently attached polyamine segment are selectively N-acylated using acylating reagents such as organic acid halides or organic acid anhydrides. Primary amines N-acylated in this manner yield primary amides. Similarly, secondary amines N-acylated in this manner yield secondary amides. Tertiary amines are not acylated. Useful methods for the selective N-acylation of amine functionalities in the presence of hydroxyl groups can be found in work published by Katsutoshi Inoue et al. (Adv. Chitin Science, Vol.: 1, Page: 271, Year: 1996) and in work published by Gunda I. Georg et al. (Bioorganic and Medicinal Chemistry Letters, Vol.: 4, No. 2; Page: 335, Year: 1994). The contents of each of these publications are hereby incorporated herein by reference.

In a fourth embodiment, the. hydrophobic polymer segment is a hydrophobic polyamine. Specifically, the hydrophobic polyamine polymer segment is a poly-N-alkylated derivative of a water soluble polyamine.

The water soluble polyamine, from which the hydrophobic poly-N-alkylated polyamine is derived, is selected from the group of water soluble polyamines consisting of polyethylenimines, polyallylamines, polyvinylamines, poly(propylene imine) dendrimers, and poly(amidoamine) dendrimers. The alkyl groups of the poly-N-alkylated derivative of the water soluble polyamine have the following general form: —CHX$_1$X$_2$. The group X$_1$ may be H, an alkyl, a substituted alkyl, an aryl, or a substituted aryl group. The group X$_2$ also may be H, an alkyl, a substituted alkyl, an aryl, or a substituted aryl group. The degree of N-alkylation of the covalently attached water soluble polyamine is greater than 10% of the total amine functionalities on the water soluble polyamine. More preferably the degree of N-alkylation is greater than 20%. Still more preferably the degree of N-alkylation is greater than 30%.

The hydrophobic polyamine polymer segment may be prepared by first covalently attaching the water soluble polyamine, through one of its amine functionalities, to the reducing terminus of the polyuronic acid. This covalent attachment is readily accomplished by reductive amination, as described in detail in the following section ("Covalent Attachment to the Reducing Terminus of the Polyuronic Acid"). In the second step, the multiple amine functionalities of the covalently attached polyamine segment are selectively N-alkylated by reductive amination using aldehydes and/or ketones as the source of the alkyl groups. Reductive amination is conveniently and selectively carried out by using borohydride or cyanoborohydride salts or by using catalytic hydrogenation.

The hydrophobic polymers of the present invention have a number average molecular weight less than or equal to 15,000, and more preferably less than or equal to 10,000. The hydrophobic polymers of the present invention have a number average molecular weight greater than or equal to 300. The preferred range of number average molecular weight is from 500 to 5000.

Covalent Attachment to the Reducing Terminus of the Polyuronic Acid

As there is only one unique functional group per polyuronic acid molecule, the terminal aldehyde group, covalent attachment of a hydrophobic polymer to the terminal aldehyde is the method of choice for preparing pigment dispersants from polyuronic acids described herein. Although many synthetic approaches are available, the preferred method is reductive animation using as the amine starting material either 1) an amino terminated hydrophobic polymer or 2) a polyamine. In the former case, the desired polyuronic acid derivative is obtained directly. In the latter case, the polyamine, which is covalently attached through one of its amine functionalities, must be further functionalized, using selective methods, such that the covalently attached polyamine becomes suitably hydrophobic. As is well known for polysaccharides, such as polyuronic acid, the aldehyde group on the reducing terminus exists in solution predominantly as a cyclic hemiacetal. Reductive animation using either primary or secondary amines results in opening, and thus disruption, of the cyclic hemiacetal.

Reductive amination is conveniently and selectively carried out using borohydride or cyanoborohydride salts in aqueous or alcoholic aqueous solutions. Typically used borohydride salts include sodium borohydride, potassium borohydride, lithium borohydride, tetramethylammonium borohydride, and tetrabutylammonium borohydride. Typically used cyanoborohydride salts include sodium cyanoborohydride, potassium cyanoborohydride, lithium cyanoborohydride, and tetrabutylammonium cyanoborohydride. Borohydride salts must be used at pH values greater than about 7. Cyanoborohydride salts may be used at pH values as low as about 3. Another convenient and selective method is catalytic hydrogenation using metal catalysts. Typical metal catalysts include any of the Group VIII metals, with nickel, palladium, platinum, and ruthenium being preferred. The metal catalysts may be used in either supported or unsupported forms. Hydrogen pressures are greater than 100 psi, and more preferably greater than 700 psi. Reaction temperatures are in the range of 10° C. to 100° C., and more preferably in the range 30° C. to 70° C. Less selective reagents for reductive amination which may be used include 1) zinc and hydrochloric acid, 2) iron pentacarbonyl and alcoholic potassium hydroxide, and 3) formic acid.

Synthetic approaches other than reductive amination, which result in covalent attachment of a hydrophobic polymer to the reducing terminus of the polyuronic acid, also may be used.

COLORANTS

Colorants useful in practicing the invention comprise both pigments and dyes.

Pigments

The pigments of the present invention comprise at least one selected from the group consisting of organic or inorganic pigments. The term "pigment" as used herein means an insoluble colorant.

The pigment particles are sufficiently small to permit free flow of the pigment dispersed ink through the ink jet printing device, especially through the ejecting nozzles which typically have a diameter ranging from 10 to 50 microns. The particle diameter of the pigment is preferably 10 microns or less, more preferably 1.0 microns or less and, most preferably, 0.3 microns or less. Preferably, the particle diameter of the pigment is greater than or equal to 0.005 microns.

The selected pigment may be used in dry or wet form. Usually pigments are manufactured in aqueous media and the resulting pigment is obtained as a water wet presscake. In this presscake form, the pigment is not agglomerated to the extent that it is in a dry form. Pigments in wet presscake form do not require as much deflocculation in the process of preparing inks as do dry pigments.

Pigments of the present invention may include the following: Symuler Fast Yellow GF (Dainippon Ink; C.I. Pigment Yellow 12), Symuler Fast Yellow GRF (Dainippon Ink; C.I. Pigment Yellow 13), Symuler Fast Yellow 5GF (Dainippon Ink; C.I. Pigment Yellow 14), Irgalite Yellow CG (Ciba-Geigy; C.I. Pigment Yellow 16), Symuler Fast Yellow HGF (Dainippon Ink; C.I. Pigment Yellow 17), Symuler Fast Yellow 4117 (Dainippon Ink; C.I. Pigment Yellow 73), Symuler Fast Yellow 4191N (Dainippon Ink; C.I. Pigment Yellow 74), Symuler Fast Yellow 4181 (Dainippon Ink; C.I. Pigment Yellow 83), Chromophthal Yellow 3G (Ciba-Geigy; C.I. Pigment Yellow 93), Chromophthal Yellow GR (Ciba-Geigy; C.I. Pigment Yellow 95), Symuler Fast Yellow 4186 (Dainippon Ink; C.I. Pigment Yellow 97), Hansa Brilliant Yellow 10GX (Hoechst Celanese; C.I. Pigment Yellow 98), Permanent Yellow G3R-01 (Hoechst Celanese; C.I. Pigment Yellow 114), Chromophthal Yellow 8G (Ciba-Geigy; C.I. Pigment Yellow 128), Irgazin Yellow 5GT (Ciba-Geigy; C.I. Pigment Yellow 129), Hostaperm Yellow H4G (Hoechst Celanese; C.I. Pigment Yellow 151), Symuler Fast Yellow 4192 (Dainippon Ink; C.I. Pigment Yellow 154), Hostaperm Orange GR (Hoechst Celanese; C.I. Pigment Orange 43), Paliogen Orange (BASF; C.I. Pigment Orange 51), Symuler Brilliant Carmine (Dainippon Ink; C.I. Pigment Red 57:1), Fastogen Super Magenta (Dainippon Ink; C.I. Pigment Red 122), Paliogen Red L3870 (BASF; C.I. Pigment Red 123), Hostaperm Scarlet GO (Hoechst Celanese; C.I. Pigment Red 168), Permanent Rubine F6B (Hoechst Celanese; C.I. Pigment Red 184), Monastral Magenta (Ciba-Geigy; C.I. Pigment Red 202), Monastral Scarlet (Ciba-Geigy; C.I. Pigment Red 207), Fastogen Blue GP-100 (Dainippon Ink; C.I. Pigment Blue 15:2), Fastogen Blue GNPR (Dainippon Ink; C.I. Pigment Blue 15:3), Fastogen Blue GNPS (Dainippon Ink; C.I. Pigment Blue 15:4), Micracet Blue R (Ciba-Geigy; C.I. Pigment Blue 60), Fastogen Green S (Dainippon Ink; C.I. Pigment Green 7), Fastogen Green 2YK (Dainippon Ink; C.I. Pigment Green 36), Fastogen Super Red (Dainippon Ink; C.I. Pigment Violet 19), Fastogen Super Violet (Dainippon Ink; C.I. Pigment Violet 23), Monastral Maroon RT-229-D (Ciba-Geigy; C.I. Pigment Violet 42), Raven 1170 (Columbian Chemicals; C.I. Pigment Black 7), Special Black 4A (Degussa; C.I. Pigment Black 7), Color Black FW 200 (Degussa; C.I; Pigment Black 7), Color Black FW 2 (Degussa; C.I. Pigment Black 7), Color Black FW 1 (Degussa; C.I. Pigment Black 7), Color Black FW 18 (Degussa; C.I. Pigment Black 7), Color Black S 160 (Degussa; C.I. Pigment Black 7), Color Black S 170 (Degussa; C.I. Pigment Black 7), Special Black 6 (Degussa; C.I. Pigment Black 7), and Special Black 4 (Degussa; C.I. Pigment Black 7). Pigments of the present invention, which are surface functionalized such that a pigment dispersant is not necessary, may include the following: Microjet C-Type CW-1 (Orient Chemical Co.), Microjet C-Type CW-2 (Orient Chemical Co.), Cabo-jet 200 (Cabot Corporation), and Cabo-jet 300 (Cabot Corporation). All four of these examples are carbon-black based pigment dispersions.

The amount of pigment in the ink composition of the present invention is about 0.1% to 20% by weight and more preferably 0.1 to 10% by weight.

Dyes

The dyes of the present invention comprise at least one selected from the group consisting of water soluble dyes which include the Acid, Direct, Food, and Reactive dyes.

Dyes of the present invention may include the following from the Color Index: C.I. Acid Black 7, C.I. Acid Black 24, C.I. Acid Black 26, C.I. Acid Black 48, C.I. Acid Black 52, C.I. Acid Black 58, C.I. Acid Black 60, C.I. Acid Black 107, C.I. Acid Black 109, C.I. Acid Black 118, C.I. Acid Black 119, C.I. Acid Black 131, C.I. Acid Black 140, C.I. Acid Black 155, C.I. Acid Black 156, C.I. Acid Black 187, C.I. Direct Black 17, C.I. Direct Black 19, C.I. Direct Black 32, C.I. Direct Black 38, C.I. Direct Black 51, C.I Direct Black71, C.I. Direct Black 74, C.I. Direct Black 75, C.I. Direct Black 112, C.I. Direct Black 117, C.I. Direct Black 154, C.I. Direct Black 163, C.I. Direct Black 168, C.I. Food Black 1, C.I. Food Black 2, C.I. Acid Red 8, C.I. Acid Red 17, C.I. Acid Red 32, C.I. Acid Red 35, C.I. Acid Red 37, C.I. Acid Red 42, C.I. Acid Red 57, C.I. Acid Red 92, C.I. Acid Red 115, C.I. Acid Red 119, C.I. Acid Red 131, C.I. Acid Red 133, C.I. Acid Red 134, C.I. Acid Red 154, C.I. Acid Red 186, C.I. Acid Red 249, C.I. Acid Red 254, C.I. Acid Red 256, C.I. Direct Red 37, C.I. Direct Red 63, C.I. Direct Red 75, C.I Direct Red 79, C.I. Direct Red 80, C.I. Direct Red 83, C.I. Direct Red 99, C.I. Direct Red 220, C.I. Direct Red 224, C.I. Direct Red 227, C.I. Reactive Red 4, C.I. Reactive Red 23, C.I. Reactive Red 24, C.I. Reactive Red 31, C.I . Reactive Red 56, C. I. Acid Violet 11, C.I. Acid Violet 34, C.I. Acid Violet 75, C.I. Direct Violet 47, C.I. Direct Violet 48, C.I. Direct Violet 51, C.I. Direct Violet 90, C.I. Direct Violet 94, C.I. Acid Blue 9, C.I. Acid Blue 29, C.I. Acid Blue 62, C.I. Acid Bl Blue 120, C.I. Acid Blue 175, C.I. Acid Blue 183, C.I. Direct Blue 1, C.I. Direct Blue 6, C.I. Direct Blue 8, C.I. Direct Blue 15, C.I. Direct Blue 25, C.I. Direct Blue 71, C.I. Direct Blue 76, C.I. Direct Blue 80, C.I. Direct Blue 86, C.I. Direct Blue 90, C.I. Direct Blue 106, C.I. Direct Blue 108, C.I. Direct Blue 123, C.I. Direct Blue 163, C.I. Direct Blue 165, C.I. Direct Blue 199, C.I. Direct Blue 226, C.I. Reactive Blue 7, C.I. Reactive Blue 13, C.I. Acid Yellow 3, C.I. Acid Yellow 17, C.I. Acid Yellow 19, C.I. Acid Yellow 23, C.I. Acid Yellow 25, C.I. Acid Yellow 29, C.I. Acid Yellow 38, C.I. Acid Yellow 49, C.I. Acid Yellow 59, C.I. Acid Yellow 61, C.I. Acid Yellow 72, C.I. Direct Yellow 27, C.I. Direct Yellow 28, C.I. Direct Yellow 33, C.I. Direct Yellow 39, C.I. Direct Yellow 58, C.I. Direct Yellow 86, C.I. Direct Yellow 100, C.I. Direct Yellow 142, and C.I. Reactive Yellow 2.

The amount of dye in the ink composition of the present invention is about 0.1% to 25% by weight and more preferably 0.1 to 15% by weight.

WATER

Water is the principal solvent for the aqueous ink compositions of the present invention. Additional components which may be included in the ink compositions are given below. A solution of water and water soluble organic solvent(s) forms an aqueous carrier medium. Selection of a suitable mixture of water and water soluble organic solvent(s) to form the aqueous carrier medium depends on the requirements of the specific application, especially with regard to viscosity, surface tension, and compatibility with the materials from which the print head is constructed. Being water soluble, the polyoxyalkylenated polyfluoro-isopropylidene glycerol cosolvent is one of the components of the aqueous carrier medium. The amount of the aqueous carrier medium in the ink composition of the present invention is preferably 70 to 99.8% by weight.

BASE

To solubilize the polyuronic acid segment of the pigment dispersant in the aqueous medium, it may be necessary to neutralize some or all of the polyuronic acid's carboxylic acid functionalities. Bases which are suitable for this purpose include organic bases, alkanolamines, alkali metal hydroxides, and mixtures thereof. Examples of suitable bases include the following: methylamine, dimethylamine, trimethylamine, morpholine, N-methylmorpholine, monoethanolamine, diethanolamine, triethanolamine, N-methyl-monoethanolamine, N,N-dimethyl-monoethanolamine, N-methyl-diethanolamine, tetramethylammonium hydroxide, ammonia, lithium hydroxide, sodium hydroxide, potassium hydroxide, rubidium hydroxide, and cesium hydroxide.

WATER SOLUBLE COSOLVENTS

In addition to the above described components, the inks may contain, optionally, one or more water soluble organic solvents. Water soluble organic solvents are well known and include: (1) alcohols such as isopropyl alcohol, butyl alcohols, etc. (2) ketones such as acetone, methyl ethyl ketone, etc. (3) ethers such as tetrahydrofuran, dioxane, etc. (4) esters such as ethyl acetate, propylene carbonate, etc. (5) polyhydric alcohols such as ethylene glycol, propylene glycol, butylene glycol, diethylene glycol, triethylene glycol, polyethylene glycol, polypropylene glycol, 1,5-pentanediol, 1,2,6-hexanetriol, thiodiglycol, glycerol, etc. (6) lower alkyl ethers of polyhydric alcohols such as ethylene glycol monomethyl ether, ethylene glycol monoethyl ether, ethylene glycol mono-n-propyl ether, ethylene glycol mono-isopropyl ether, propylene glycol monomethyl ether, propylene glycol monoethyl ether, diethylene glycol monomethyl ether, diethylene glycol monoethyl ether, diethylene glycol mono-n-propyl ether, diethylene glycol mono-isopropyl ether, diethylene glycol mono-n-butyl ether, diethylene glycol mono-sec-butyl ether, diethylene glycol mono-isobutyl ether, diethylene glycol mono-tert-butyl ether, diethylene glycol mono-n-amyl ether, diethylene glycol mono-n-hexyl ether, triethylene glycol monomethyl ether, triethylene glycol monoethyl ether, triethylene glycol mono-n-propyl ether, triethylene glycol mono-isopropyl ether, triethylene glycol mono-n-butyl ether, triethylene glycol mono-sec-butyl ether, triethylene glycol mono-isobutyl ether, triethylene glycol mono-tert-butyl ether, triethylene glycol mono-n-amyl ether, triethylene glycol mono-n-hexyl ether, dipropylene glycol monomethyl ether, dipropylene glycol monoethyl ether, dipropylene glycol mono-n-propyl ether, dipropylene glycol mono-n-butyl ether, etc. (7) nitrogen containing compounds such as urea, pyrrolidone, N-methyl-2-pyrrolidone, etc. (8) sulfur containing compounds such as dimethylsulfoxide, tetramethylene sulfoxide, etc. No particular limitation is imposed on the total amount of cosolvent to be used in the ink. Preferably it is present in a range of 0.5 to 40 wt. %.

OTHER COMPONENTS

In addition to the above described components, the inks may contain, optionally, one or more penetrability-imparting surfactants selected from the group consisting of anionic or nonionic surfactants. Examples of anionic surfactants include fatty acid salts, higher alcohol sulfuric ester salts, alkylbenzene sulfonates, and higher alcohol phosphoric ester salts. Examples of nonionic surfactants include ethylene oxide adducts of acetylenic diols, ethylene oxide adducts of higher alcohols, ethylene oxide adducts of alkylphenols, ethylene oxide adducts of higher alcohol fatty acid esters, ethylene oxide adducts of higher alkyl amines, ethylene oxide adducts of fatty acid amides, ethylene oxide adducts of polypropylene glycol, fatty acid esters of polyhydric alcohols, alkanolamine fatty acid amides and ethylene oxide-propylene oxide copolymers. Preferably used are ethylene oxide adducts of acetylenic diols which are available from Air Products and Chemicals, Inc.; Allentown, Pa., 18195; USA. Examples include Sulfonyl 465 (ethoxylatedtetramethyl decynediol), Sulfonyl CT-136 (acetylenic diol and anionic surfactant blend), Sulfonyl GA (acetylenic diol blend) and Sulfonyl TG (acetylenic diol blend in ethylene glycol). No particular limitation is imposed on the amount of penetrability-imparting surfactant to be used in the ink. Preferably, it is present in a range of 0.01 to 5 wt. %. In addition to the above penetrability-imparting surfactants, the inks may contain additives such as pH buffers, biocides, viscosity modifiers, ultraviolet ray absorbers, and antioxidants. The amounts of all components of the ink are selected such that the viscosity of the ink is less than 10 cps at 20° C.

INK PREPARATION

The pigment based ink compositions of the present invention can be prepared in one step by dispersing and mixing the above described components using an acceptable method. Alternatively, the ink composition can be prepared in two steps by 1) dispersing and mixing some of the above described components and then 2) adding the remaining components to the dispersion and mixing. The dispersing step may be accomplished using a ball mill, a sand mill, an atritor, a roll mill, an agitator mill, a horizontal mini-mill, a Henschel mixer, a colloid mill, an ultrasonic homogenizer, a jet mill, or an angmill to obtain a homogeneous dispersion. In the case of dye based ink compositions, since a dispersant is absent and pigment deaggregation is unnecessary, mixing of the components in a well agitated vessel, rather than in special dispersing equipment, is sufficient.

It may be desirable to prepare first the pigmented ink in a concentrated form and then subsequently dilute the concentrated dispersion to a concentration appropriate for use in the ink jet printer. Also, it is generally desirable to filter the pigment dispersed aqueous ink composition, preferably using a metal mesh filter or a membrane filter. Filtration may be accomplished by applying pressure to the ink composition being filtered or by reducing the pressure on the receiving end of the filtration device. Centrifugal separation may also be used to remove large particles which may cause obstruction of the nozzles on the printhead of the ink jet printer.

EXAMPLES

The present invention will be further clarified by the following specific examples.

Preparation of 2,2-bis(trifluoromethyl)-4-hydroxymethyl-1,3-dioxolane

In a 4 L round bottom flask, hexafluoroacetone (99.7 g; 0.6 moles) was condensed at 0° C. into a well stirred solution of glycerol (55.3 g; 0.6 moles) in 500 mL of anhydrous ethylene glycol dimethyl ether. After the addition of hexafluoroacetone was complete, the solution was allowed to warmn to ambient temperature. Next, a solution of 1,3-dieyclohexylcarbodiimide (136.2 g; 0.66 moles) in 2 L of anhydrous ethylene glycol dimethyl ether was added slowly to the resulting hemiketal solution over a period of about one and a half hours. The combined solution was stirred for an additional hour and then the low boiling solvent was removed using a rotary evaporator. The remaining liquid was transferred to a 250 mL round bottom flask and the liquid heated with stirring at 100° C. for 1 hour. While continuing to heat the liquid, the product was isolated by vacuum distillation at 76° C. and 18 mm of Hg. The yield of product was 117 g which is 81% of the theoretical value.

Preparation of 2-methyl-2-trifluoromethyl-4-hydroxymethyl-1,3-dioxolane 1,1,1-trifluoroacetone (67.3 g; 0.6 moles), which was chilled to about 10° C., was added rapidly to a well stirred solution of glycerol (55.3 g; 0.6 moles) in 500 mL of anhydrous ethylene glycol dimethyl ether contained in a 4 L round bottom flask. Next, a solution of 1,3-dicyclohexylcarbodiimide (136.2 g; 0.66 moles) in 2 L of anhydrous ethylene glycol dimethyl ether was added slowly to the resulting hemiketal solution over a period of about one and a half hours. The combined solution was stirred for an additional hour and then the low boiling solvent was removed using a rotary evaporator. The remaining liquid was transferred to a 250 mL round bottom flask and the liquid was heated with stirring at 100° C. for 1 hour. While continuing to heat the liquid, the product was isolated by vacuum distillation at 78° C. and 14 mm of Hg. The yield of product was 86 g which is 77% of the theoretical value.

FORMULA 2

Preparation of

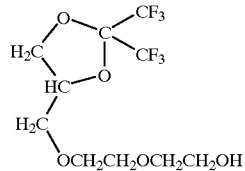

OCH$_2$CH$_2$OCH$_2$CH$_2$OH

A 2 L stirrer-equipped autoclave was charged with 2,2-bis(trifluoromethyl)-4-hydroxymethyl-1,3-dioxolane (96.1 g; 0.4 moles) and potassium hydroxide (0.5 g). Ethylene oxide (35.3 g; 0.8 moles) was condensed at 0° C. into the mixture of the cyclic ketal and the basic catalyst with stirring. While continuing to cool the combined mixture, the autoclave was purged of oxygen using argon gas and then sealed. While stirring the mixture, the temperature of the autoclave was raised to 125° C. and then kept at that temperature for 3 hours. After cooling the mixture to room temperature, the autoclave was vented and the crude product was transferred to a 250 mL round bottom flask. Pure product was isolated by vacuum distillation at 81° C. and 0.3 mm of Hg. The yield of product was 119 g which is 90% of the theoretical value. In the examples and the test evaluations described below, this compound is abbreviated (F$_3$)(F$_3$)-ipg-(EO)$_2$.

FORMULA 3

Preparation of

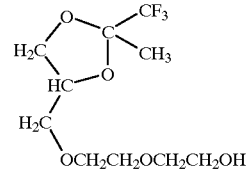

OCH$_2$CH$_2$OCH$_2$CH$_2$OH

A 2 L stirrer-equipped autoclave was charged with 2-methyl-2-trifluoromethyl-4-hydroxymethyl-1,3-dioxolane (74.5 g; 0.4 moles) and potassium hydroxide (0.4 g). Ethylene oxide (35.3 g; 0.8 moles) was condensed at 0° C. into the mixture of the cyclic ketal and the basic catalyst with stirring. While continuing to cool the combined mixture, the autoclave was purged of oxygen using argon gas and then sealed. While stirring the mixture, the temperature of the autoclave was raised to 125° C. and then kept at that temperature for 3 hours. After cooling the mixture to room temperature, the autoclave was vented and the crude product was transferred to a 250 mL round bottom flask. Pure product was isolated by vacuum distillation at 89° C. and 0.3 mm of Hg. The yield of product was 96 g which is 87% of the theoretical value. In the examples and the test evaluations described below, this compound is abbreviated (F$_3$)(H$_3$)-ipg-(EO)$_2$.

FORMULA 4

Preparation of

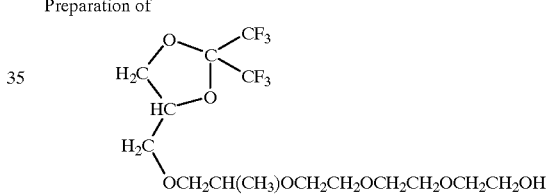

OCH$_2$CH(CH$_3$)OCH$_2$CH$_2$OCH$_2$CH$_2$OCH$_2$CH$_2$OH

A 2 L stirrer-equipped autoclave was charged with 2,2-bis(trifluoromethyl)-4-hydroxymethyl-1,3-dioxolane (96.1 g; 0.4 moles), propylene oxide (23.3 g; 0.4 moles), and potassium hydroxide (0.6 g). The autoclave was purged of oxygen using argon gas and then sealed. While stirring the mixture, the temperature of the autoclave was raised to 125° C. and then kept at that temperature for 3 hours. After cooling the mixture to room temperature, the autoclave was vented. Next, ethylene oxide (52.9 g; 1.2 moles) was condensed at 0° C. into the mixture with stirring. While continuing to cool the combined mixture, the autoclave was again purged of oxygen using argon gas and then sealed. While stirring the mixture, the temperature of the autoclave was raised to 130° C. and then kept at that temperature for 3 hours. After cooling the mixture to room temperature, the autoclave was vented and the crude product was transferred to a 300 mL round bottom flask. Pure product was isolated by vacuum distillation at 186° C. and 0.3 mm of Hg. The yield of product was 143 g which is 83% of the theoretical value. In the examples and test evaluations described below, this compound is abbreviated (F$_3$)(F$_3$)-ipg-(PO)(EO)$_3$.

Preparation of Polyguluronic Acid 150 g of alginic acid (Product Name: Ultra Low Viscosity Alginic Acid; Kibun Food Kemifa; Japan) was slurried in 600 mL of deionized water in a 1000 mL beaker. To this slurry was added 27.65 g of lithium hydroxide monohydrate, while stirring the slurry with an overhead mechanical stirrer. The alginic acid dissolved to yield a solution with a pH value of approximately 4.1. Deionized water was added to give a total solution volume of 750 mL. Next, the solution was chilled in an ice bath to a temperature less than 5° C. While stirring the chilled solution vigorously using the mechanical stirrer, 43.75 g of sodium periodate was added rapidly. After the chilled solution was stirred vigorously for 1 hour, the ice bath was removed and the stirred solution was allowed to warm to ambient temperature.

Next, 8 g of concentrated hydrochloric acid solution was added with stirring. The beaker was covered and set aside to stand for 4 days. During this time period, a considerable amount of solid iodine settled on the bottom of the beaker. The slightly cloudy supernatant was decanted from the solid iodine and transferred to a 2 L thick walled, lidded PFA container. The iodine, from which the supernatant was decanted, was disposed of by standard procedures. The threads on the opening of the PFA container were wrapped with Teflon tape and the lid was tightly sealed. The sealed PFA container was submerged using a lead weight in a 70° C. water bath for 8 hours. After cooling to room temperature, the sealed container was opened and the mixture was filtered through a sheet of #4 Whatman filter paper. The filtrate was transferred to a round bottom flask to which a reflux condenser was attached. After adding 2 mL of n-octyl alcohol to the solution, the mixture was magnetically stirred and heated to reflux for 2 hours. While continuing to stir and reflux the mixture, concentrated hydrochloric acid was added gradually through the reflux condenser until the pH of the mixture reached a value of 1.0. The pH value was estimated using Hydration Microfine pH test paper having a range of 0.8 to 2.0. This addition of acid resulted in the precipitation of an off-white solid. The mixture was heated at reflux for an additional 7 hours. After allowing the mixture to cool to ambient temperature, the solid was collected by vacuum filtration using a fine porosity (pore size: 16–40 microns) fritted glass filter. The wet solid was transferred to a 1 L beaker along with approximately 600 mL of deionized water.

While stirring the slurry, triethylamine was added gradually until all of the solid dissolved. The pH of the resulting solution was approximately 7 as determined using Microfine pH test paper having a range of 5.5 to 8.0. The resulting solution was filtered through a sheet of #2 Whatman filter paper. Next, 6N hydrochloric acid was added gradually to the solution which contained both low molecular weight polyguluronic and polymannuronic acids, until the pH of the mixture reached a value of 3.1, as was determined using Microfine pH test paper having a range of 1.3 to 4.4. The solid which precipitated was collected by vacuum filtration using a fine porosity (pore size: 16–40 microns) fritted glass filter. The wet solid was transferred to a 1 L beaker along with approximately 250 mL of deionized water. While stirring the slurry, 500 mL of 95% ethanol was added gradually with stirring. After stirring for 1 hour, the solid was collected by vacuum filtration using a fine porosity (pore size: 16–40 microns) fritted glass filter. The solid was washed with several portions of 95% ethanol and then set aside to air dry. Finally, the solid was dried under vacuum to a constant weight. The yield of product was 17 g. Repeating this procedure 11 times gave a total yield of polyguluronic acid of slightly more than 200 g.

Preparation of Polyguluronic Acid Reductively Aminated with Polyethylenimine (MW=800) [PGA-PEI800]

200 g of polyguluronic acid and 70 g of polyethylenimine (Product Name: Lupasol FG; BASF; MW=800) were dissolved in 600 mL of deionized water contained in a 5 L beaker with stirring. An additional 340 g of the same polyethylenimine was added to the solution with stirring. Next, the pH of the combined solution was adjusted to 8.95 by dropwise addition of 12 N hydrochloric acid solution with vigorous stirring. After deionized water was added to bring the total volume of the solution up to 1500 mL, the solution was set aside to stand at room temperature for 10 days. While stirring the solution vigorously, 10.0 g of sodium borohydride was added to the solution in five 2.0 g portions over a period of 6 hours. The solution was set aside to stand overnight. The solution was again stirred vigorously, and 2.0 g of lithium borohydride was added in ten 0.2 g portions over a period of 10 hours. The solution was again set aside to stand overnight. While stirring the solution vigorously, the pH of the combined solution was adjusted to 2.0 by dropwise addition of 12 N hydrochloric acid solution. Next, 3 L of ethanol was added with vigorous stirring. The product separated as an oil from which the supernatant solution was discarded. After triturating the oil with several large portions of ethanol, the oil solidified. The yellowish solid was air dried and then dried under vacuum. The weight of dried solid was 176 g.

Preparation of Pigment Dispersant [PGA-PEI800-(i-propyl)$_x$(n-propyl)$_y$] (PGA-PEI800 reductively aminated using acetone and propionaldehyde)

60 g of PGA-PEI800, 200 g of acetone, and 26 g of N,N-dimethylethanolamine were added to 900 mL of deionized water contained in a 5 L beaker with stirring. While stirring the mixture vigorously, 35.0 g of tetramethylammonium cyanoborohydride, which was prepared by metathesis of sodium cyanoborohydride with tetramethylammonium chloride in absolute ethanol, was added in seven 5.0 g portions over a period of 21 hours. After the first 5.0 g addition of tetramethylammonium cyanoborohydride, the pH of the mixture was adjusted to 8.2 by the dropwise addition of 3 N hydrochloric acid solution.

Similarly, after the second addition, the pH of the mixture was adjusted to 7.8; after the third addition the pH was adjusted to 7.4; after the fourth addition, the pH was adjusted to 7.0; after the fifth addition, the pH was adjusted to 6.6; after the sixth addition, the pH was adjusted to 6.2; and after the last addition, the pH was adjusted to 5.8. After all of the tetramethylammonium cyanoborohydride had been added, the mixture was set aside to stand for 12 hours. Next, 200 g of propionaldehyde was added to the reaction mixture. While stirring the mixture vigorously, 35.0 g of tetramethylammonlum cyanoborohydride was added in seven 5.0 g portions over a period of 21 hours. After each 5.0 g addition of tetramethylammonium cyanoborohydride, the pH of the mixture was adjusted to 5.8 by the dropwise addition of 3 N hydrochloric acid solution. After all of the tetramethylammonium cyanoborohydride had been added, the mixture was set aside to stand for 12 hours.

Next, 3 L of 2-propanol was added with stirring. While cooling the mixture using an ice bath, 12 N hydrochloric acid solution was added dropwise to the stirred mixture, contained within a well ventilated fume hood. This dropwise addition was continued until the pH of the mixture reached a constant value of 2.0. The addition of hydrochloric acid resulted in precipitation of an off-white solid. After setting the acidified mixed aside to stand for 12 hours, the solid was collected by filtration and washed with several large portions of 2-propanol. The solid was air-dried and then dried to a constant weight under vacuum. A 250 mL flask was loaded with 30.0 g of the dried solid and 90.0 g of deionized water. While stirring the mixture vigorously, N,N-dimethylethanolamine was added in small portions. After most of the solid had dissolved, N,N-dimethylethanolamine was added dropwise while concurrently monitoring the pH of the solution.

The addition of N,N-dimethylethanolamine was stopped when the solution pH reached a constant value of 5.0. Additional water was added such that a total solution weight of 136 g was obtained. For the final step, the resulting solution was filtered through a 3 micrometer teflon membrane filter to form a Pigment Dispersant Solution.

Preparation of the Pigment Dispersion

The components listed below were mixed, and the mixture was dispersed in an Eiger Motormill M250 VSE-EXJ (Eiger Japan, Tokyo, JAPAN). Glass beads (diameter: 1.0 mm), which had a total combined volume of 175 mL, were used as the milling media. Milling was carried out at 4000 rpm for a period of four hours.

FW 18 (carbon black pigment; Degussa Corp.; C.I. Pigment Black 7) 38 g

Pigment Dispersant Solution (described above; 22 wt. % solids) 78 g deionized water 134 g The yield of the pigment dispersion was 196 g. This procedure was repeated four times and the five batches were combined with stirring in a polyethylene bottle. Next, N,N-dimethylethanolamine was added dropwise while concurrently monitoring the pH of the pigment dispersion. The addition of N,N-dimethylethanolamine was stopped when the pH of the pigment dispersion reached a constant value of 8.5.

EXAMPLE 1

The components listed below were added sequentially to a beaker with stirring. The combined mixture was stiffed for 2 hours. Next, the mixture was filtered through a 3 micron membrane filter, such that an ink suitable for ink jet printing was obtained.

Pigment Dispersion (described above; 15 wt. % solids) 100.0 g deionized water 220.0 g glycerol 20.0 g $(F_3)(F_3)$-ipg-$(EO)_2$ 60.0 g

EXAMPLE 2

The components listed below were added sequentially to a beaker with stirring. The combined mixture was stirred for 2 hours. Next, the mixture was filtered through a 3 micron membrane filter, such that an ink suitable for ink jet printing was obtained.

Pigment Dispersion (described above; 15 wt. % solids) 100.0 g deionized water 220.0 g glycerol 20.0 g $(F_3)(H_3)$-ipg-$(EO)_2$ 60.0 g

EXAMPLE 3

The components listed below were added sequentially to a beaker with stirring. The combined mixture was stirred for 2 hours. Next, the mixture was filtered through a 3 micron membrane filter, such that an ink suitable for ink jet printing was obtained.

Pigment Dispersion (described above; 15 wt. % solids) 100.0 g deionized water 230.0 g glycerol 20.0 g $(F_3)(F_3)$-ipg-$(PO)(EO)_3$ 50.0 g

COMPARATIVE EXAMPLE 1

The components listed below were added sequentially to a beaker with stirring. The combined mixture was stirred for 2 hours. Next, the mixture was filtered through a 3 micron membrane filter, such that an ink suitable for ink jet printing was obtained.

Pigment Dispersion (described above; 15 wt. % solids) 100.0 g deionized water 220.0 g glycerol 20.0 g isopropylidene glycerol (abbreviation: Solketal) 60.0 g

COMPARATIVE EXAMPLE 2

The components listed below were added sequentially to a beaker with stirring. The combined mixture was stirred for 2 hours. Next, the mixture was filtered through a 3 micron membrane filter, such that an ink suitable for ink jet printing was obtained.

Pigment Dispersion (described above; 15 wt. % solids) 100.0 g deionized water 220.0 g glycerol 20.0 g triethylene glycol (abbreviation: TEG) 60.0 g

COMPARATIVE EXAMPLE 3

The components listed below were added sequentially to a beaker with stirring. The combined mixture was stirred for 2 hours. Next, the mixture was filtered through a 3 micron membrane filter, such that an ink suitable for ink jet printing was obtained.

Pigment Dispersion (described above; 15 wt. % solids) 100.0 g deionized water 220.0 g glycerol 20.0 g diethylene glycol (abbreviation: DEG) 60.0 g

COMPARATIVE EXAMPLE 4

The components listed below were added sequentially to a beaker with stirring. The combined mixture was stiffed for 2 hours. Next, the mixture was filtered through a 3 micron membrane filter, such that an ink suitable for ink jet printing was obtained.

Pigment Dispersion (described above; 15 wt. % solids) 100.0 g deionized water 220.0 g glycerol 20.0 g diethylene glycol mono-n-butyl ether (abbreviation: DEG-MBE) 60.0 g.

COMPARATIVE EXAMPLE 5

The components listed below were added sequentially to a beaker with stirring. The combined mixture was stiffed for 2 hours. Next, the mixture was filtered through a 3 micron membrane filter, such that an ink suitable for ink jet printing was obtained.

Pigment Dispersion (described above; 15 wt. % solids) 100.0 g deionized water 220.0 g glycerol 20.0 g triethylene glycol mono-n-butyl ether (abbreviation: TEG-mBE) 60.0 g.

EVALUATION TESTS

Intermittent Printing Test

The reliability under intermittent printing conditions of the above inks was evaluated as follows. First, the ink was degassed and sealed in a heat-sealable aluminum pack. Next, the ink was loaded into the print head of an MJ-930C printer (Product Name, Seiko Epson Corporation). A line pattern which uses all of the nozzles was printed initially to establish that ink was being ejected from all nozzles with good directionality. The printing pattern was changed to one in which one drop is ejected from each nozzle successively, followed by a resting period during which the print head remains uncovered and no ink drops are ejected. This pattern, consisting of all nozzle one dot ejections followed by a rest period, is repeated successively with the length of the rest period increasing in units of 5 seconds.

For example, the first rest period is 5 seconds, the second rest period is 10 seconds, the third rest period is 15 seconds, etc. The time interval of the rest period in which a nozzle first fails was recorded. The following standards were used to evaluate the reliability with respect to the intermittent printing test: the minimum time interval before the first nozzle failure was greater than 90 seconds (A), the minimum time interval before the first nozzle failure was greater than 60 seconds and less than or equal to 90 seconds (B), and the minimum time interval before the first nozzle failure was less than or equal to 60 seconds (C). The results of this test are shown below in Table 1.

Long Term Storage Test

The reliability towards long term storage in the print head of the above inks was evaluated as follows. First, the ink was degassed and sealed in a heat-sealable aluminum pack. Next, the ink was loaded into the print head of an MJ-510C printer (Product Name, Seiko Epson Corporation). A line pattern which uses all of the nozzles was printed initially to establish that ink was being ejected from all nozzles with good directionality. Next, the ink supply was removed from the print head, and then the print head was removed from the printer. The uncapped print head was stored for 7 days at 40° C. in a constant temperature oven. The print head was reattached to the printer and the ink supply was reattached to the print head. The cleaning operation of the printer was executed followed by a line pattern which uses all of the nozzles. The cleaning operation followed by the line pattern was repeated until all of the nozzles printed with good directionality.

The following standards were used to evaluate the reliability with respect to the long term storage test: the number of cleaning operations necessary for full recovery was less than or equal to 3 (A), the number of cleaning operations necessary for full recovery was either 4 or 5 (B), the number of cleaning operations necessary for full recovery was greater than or equal to 6 and less than or equal to 10 (C), and full recovery was not obtained even after 10 cleaning operations (F). The results of this test are shown below in Table 1.

Thermal Cycling Test

The reliability towards two temperature extremes (−30° C. and 60° C.) of the above inks was evaluated as follows. First, the ink was degassed and sealed in a 30 mL glass sample bottle. The sample bottle was loaded into a 60° C. constant temperature oven and stored at that temperature condition for 24 hours. The sample was removed from the oven and transferred to a −30° C. constant temperature refrigerator and stored at that temperature condition for 24 hours. This two temperature cycle was repeated such that a total of ten cycles was completed. After the last cycle, the ink was thawed to room temperature, the glass sample bottle inverted without shaking, and the bottom of the sample bottle examined for precipitates. The following standards were used to evaluate the reliability with respect to the thermal cycling test: no precipitates (A), a small amount of precipitates (B), and a considerable amount of precipitates. For all of the inks tested, no precipitates were observed. The results of this test are shown below in Table 1.

Drying Time Test

The drying time the above inks were evaluated by printing a series of solid block patterns and wiping the patterns in 5 second increments. The printing was carried out using an MJ-930C printer (Product Name, Seiko Epson Corporation). The time in which the printed ink would not smear was recorded. The results of this test are shown below in Table 1.

TABLE 1

| Ink Sample | Cosolvent | Intermittent Printing Test | Long Term Storage Test | Thermal Cycling Test | Drying Time Test (secs) |
|---|---|---|---|---|---|
| Ex. 1 | $(F_3)(F_3)$-ipg-$(EO)_2$ | A | A | A | <5 |
| Ex. 2 | $(F_3)(H_3)$-ipg-$(EO)_2$ | A | A | A | <5 |
| Ex. 3 | $(F_3)(F_3)$-ipg-$(PO)(EO)_3$ | A | A | A | <5 |
| Cmp. Ex. 1 | Solketal | C | F | A | 45 |
| Cmp. Ex. 2 | TEG | B | A | A | >60 |
| Cmp. Ex. 3 | DEG | A | A | A | >60 |
| Cmp. Ex. 4 | DEG-mBE | B | F | A | <5 |
| Cmp. Ex. 5 | TEG-mBE | B | F | A | <5 |

What is claimed is:

1. An aqueous ink jet ink composition comprising:
    (a) water;
    (b) a pigment dispersion or dye; and
    (c) a polyoxyalkylenated polyfluoro-isopropylidene glycerol compound represented by the following Formula 1:

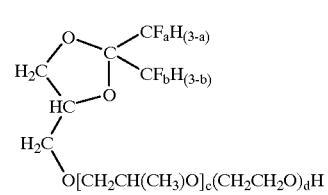

FORMULA 1

-continued wherein
a = 1–3;
b = 1–3
a + b = 2–6
c = 0 or 1; and
d = (c + 1) - 4.

2. The ink composition according to claim 1, comprising a pigment dispersion, wherein the pigment dispersion comprises the pigment and a pigment dispersant.

3. The ink composition according to claim 2, wherein the pigment dispersant is a derivative of a polyuronic acid in which a hydrophobic polymer is covalently attached to a reducing terminus of the polyuronic acid.

4. The ink composition according to claim 3, wherein the polyuronic acid consists essentially of 1,4-linked polygalacturonic acid, polyguluronic acid, polyiduronic acid, or mixed polymers thereof.

5. The ink composition according to claim 3, wherein the hydrophobic polymer is a homopolymer or copolymner prepared from at least one monomer selected from the group consisting of styrene or substituted styrenes, vinyl pyridine or substituted vinyl pyridines, methacrylic acid esters, acrylic acid esters, acrylonitrile, methacrylonitrile, butadiene, and isoprene.

6. The ink composition according to claim 3, wherein the hydrophobic polymer is composed primarily of poly(dimethylsiloxane).

7. The ink composition according to claim 3, wherein the hydrophobic polymer is a polyamide.

8. The ink composition according to claim 7, wherein the polyamide is an N-acylated derivative of a polyamine, with the polyamine being one in which greater than 50% of the amine functionalities are either primary or secondary amines.

9. The ink composition according to claim 8, wherein the polyamine is selected from the group of polyamines consisting of linear polyethylenimines, branched polyethylenimines, polyallylamine, poly(N-alkyl) allylamines, and polyvinylamine.

10. The ink composition according to claim 8, wherein the acyl groups, R—(CO)—, of the polyamide comprise at least one acyl group selected from the group consisting of: $C_nH_{(2n+1)}$—(CO)—, in which n is greater than or equal to 3; phenyl-(CO)—; substituted phenyl-(CO)—; phenyl-CH$_2$—(CO)—; substituted phenyl-CH$_2$—(CO)—; phenyl-C$_2$H$_4$—(CO)—; and substituted phenyl-C$_2$H$_4$—(CO)—.

11. The ink composition according to claim 3, wherein the hydrophobic polymer is a hydrophobic polyamine.

12. The ink composition according to claim 11, wherein the hydrophobic polyamine is a poly-N-alkylated derivative of a water soluble polyamine.

13. The ink composition according to claim 12, wherein the water soluble polyamine is selected from the group of water soluble polyamines consisting of polyethylenimines, polyallylamines, polyvinylamines, poly(propylene imine) dendrimers, and poly(amidoamine) dendrimers.

14. The ink composition according to claim 1, comprising 0.1 to 10 wt % of the pigment, 0.1 to 20 wt % of the pigment dispersant, and 70 to 99.8 wt % of an aqueous carrier medium comprising the water and the compound of Formula 1.

15. The ink composition according to claim 3, wherein the number average molecular weight of the polyuronic acid segment is greater than or equal to 700.

16. The ink composition according to claim 3, wherein the number average molecular weight of the hydrophobic polymer segment is greater than or equal to 300.

17. The ink composition according to claim 3, wherein the polyuronic acid segment of the pigment dispersant is neutralized with a neutralizing agent selected from the group consisting of organic bases, alkanolamines, alkali metal hydroxides, and mixtures thereof.

18. The ink composition according to claim 1, comprising 0.1 to 25% by weight of the compound of Formula 1 and 0.2 to 30% by weight of the pigment dispersion.

19. A printing method comprising depositing the ink composition of claim 1 onto a recording medium.

20. An ink jet printing method comprising ejecting and depositing droplets of the ink composition of claim 1 onto a recording medium.

21. A recorded medium recorded by the method of claim 19.

* * * * *

UNITED STATES PATENT AND TRADEMARK OFFICE
CERTIFICATE OF CORRECTION

PATENT NO. : 6,231,655 B1
DATED : May 15, 2001
INVENTOR(S) : William Alan Marritt Page 1 of 1

It is certified that error appears in the above-identified patent and that said Letters Patent is hereby corrected as shown below:

Title Page,
Insert -- [30] Foreign Application Priority Data Mar. 19, 1999 (JP) ... 11-76088 Aug. 25, 1999 (JP) ... 11-238788 --.

Signed and Sealed this

Twenty-seventh Day of November, 2001

Attest:

*Attesting Officer*

NICHOLAS P. GODICI
*Acting Director of the United States Patent and Trademark Office*